United States Patent
Henn

(10) Patent No.: US 8,202,599 B2
(45) Date of Patent: Jun. 19, 2012

(54) VACUUM INSULATION PANEL WITH A LEAD-THROUGH

(75) Inventor: Dieter Henn, Waltenhofen (DE)

(73) Assignee: Porextherm Daemmstoffe GmbH, Kempten (DE)

( * ) Notice: Subject to any disclaimer, the term of this patent is extended or adjusted under 35 U.S.C. 154(b) by 204 days.

(21) Appl. No.: 12/438,714

(22) PCT Filed: Aug. 6, 2007

(86) PCT No.: PCT/EP2007/006914
§ 371 (c)(1),
(2), (4) Date: May 19, 2009

(87) PCT Pub. No.: WO2008/022706
PCT Pub. Date: Feb. 28, 2008

(65) Prior Publication Data
US 2009/0324871 A1 Dec. 31, 2009

(30) Foreign Application Priority Data
Aug. 24, 2006 (DE) .......................... 10 2006 039 621

(51) Int. Cl.
*E04B 1/80* (2006.01)

(52) U.S. Cl. .................................................. 428/69
(58) Field of Classification Search .................. 428/69
See application file for complete search history.

(56) References Cited

U.S. PATENT DOCUMENTS
7,641,298 B2 * 1/2010 Hirath et al. .................. 312/401

FOREIGN PATENT DOCUMENTS
DE 1004207 * 3/1957
* cited by examiner

*Primary Examiner* — Alexander Thomas
(74) *Attorney, Agent, or Firm* — Venable LLP; Stefan J. Kirchanski

(57) ABSTRACT

To provide a cost-effective, stable vacuum insulation panel (10) having at least one lead-through (20) in a main surface (16) of an insulating material supporting body (14) and having a vacuum-tight film envelope (17), it is proposed that the lead-through (20) is formed as a bush (30) with an outer side (32) facing the insulating material supporting body (14) and that on the first bush end (36) is provided a first, preformed collar (37) extending radially away from the bush (30) into the main surface (16) and, opposite said collar, is provided a second collar (39) formed by thermal deformation of the second bush end (38), wherein the vacuum-tight film envelope (17) is welded to the collars (37, 39). A corresponding method for producing the panel is also described.

6 Claims, 2 Drawing Sheets

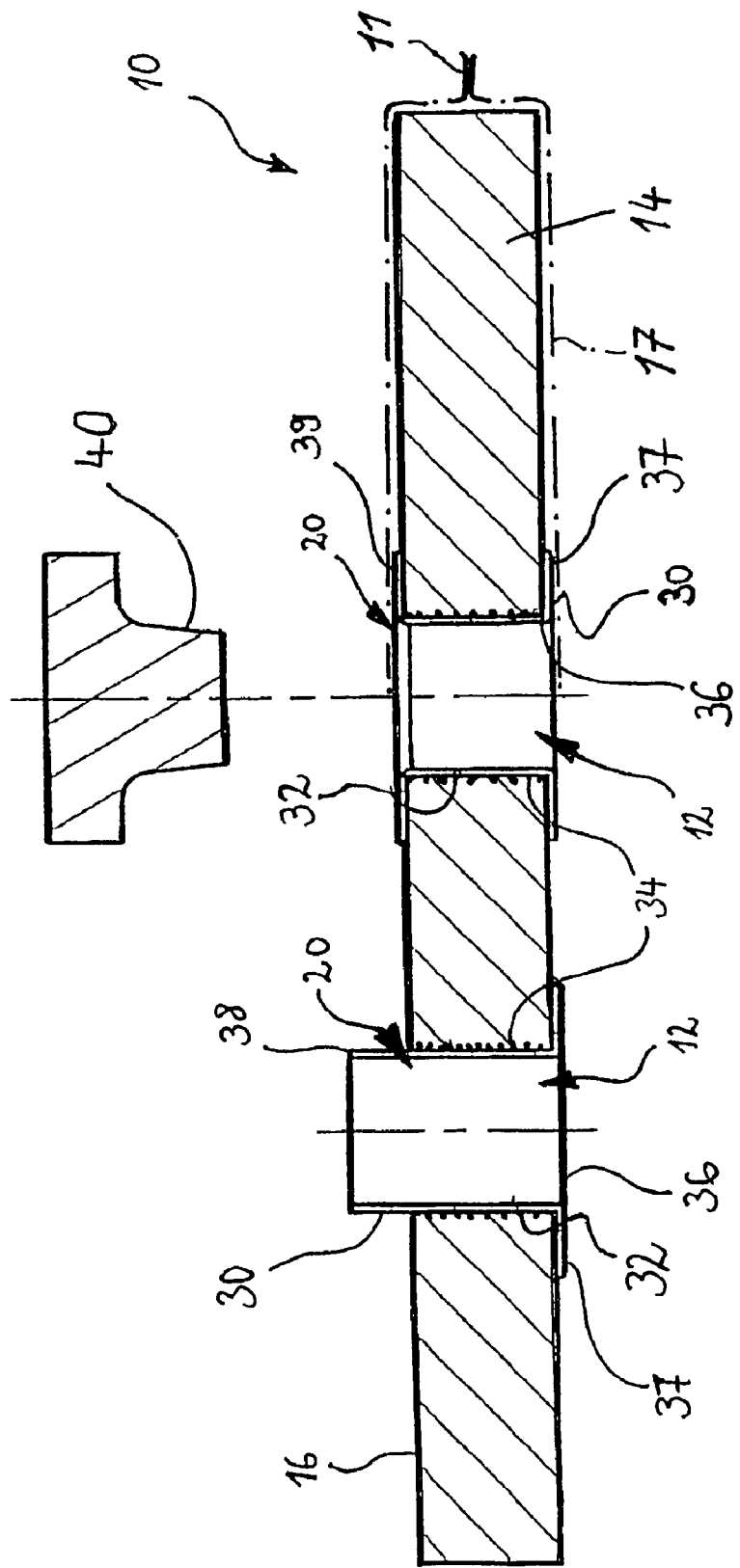

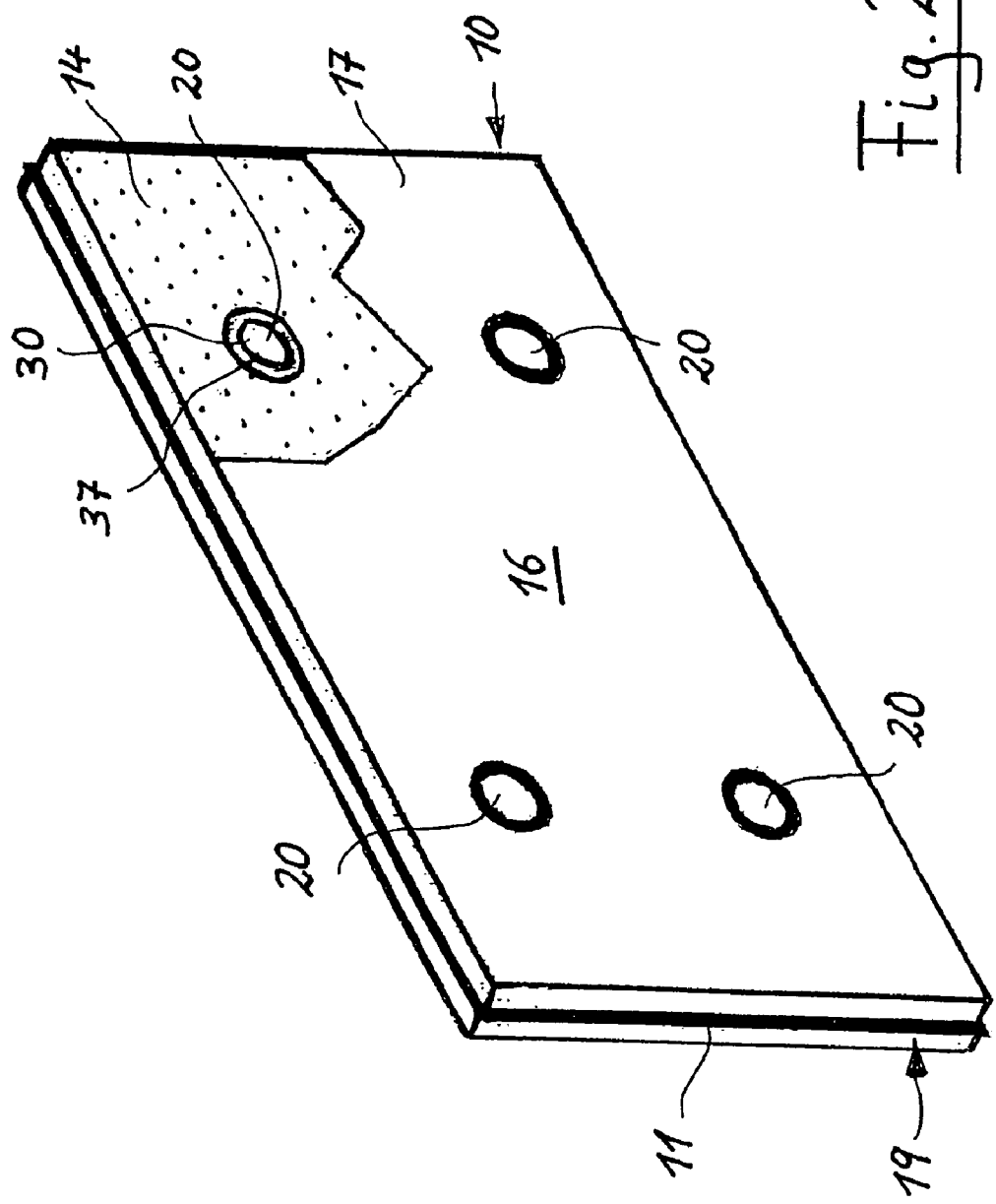

VACUUM INSULATION PANEL WITH A LEAD-THROUGH

The invention relates to a vacuum isolation panel and a corresponding method for manufacture.

Vacuum isolation panels (VIP), mainly based on fine-dispersed silicon dioxide or silica are used in various applications due to the high heat insulation properties, e.g. for energy saving insulation panels in the building field. The insulating material supporting body can also consist of precipitated silica, aerogel, open-celled PU or PS-foam, polyisocyanate foam and fibrous materials or combinations thereof. The low heat conduction is achieved by a high vacuum, generated within a foil envelope. Using such vacuum isolation panels also reduces for example the wall thickness of the insulating layer in industrial and household refrigerators or allows longer transportation times with temperature-controlled transport systems, likewise a reduction of the dimensions and the weight of insulated freight containers.

The vacuum isolation panel usually consists of an insulating material core enveloped by a vacuum-tight protective sheet. After introduction into the foil envelope the system is usually evacuated to a vacuum of 1.5 mbar and then sealed. The core material serves to inhibit the movement of still present gas molecules and forms a barrier layer against heat transmission by radiation, wherein additional opacifiers are provided, if necessary to scatter or absorb infrared radiation. As the evacuation level in the envelope directly affects the thermal conductivity and/or insulating efficiency of vacuum isolation panels the tightness of the seals around the insulating material core is of particularly relevance. Such seals or welds are also required at the edges of recesses required, f. i. provided as lead-through for conduits, tubes or fasteners in the vacuum isolation panels.

The manufacture of a lead-through in vacuum isolation panels is shown for example in WO 2004/001149. The reference proposes to realize a lead-through by penetrating bodies which are later gastight welded from the outside to the envelope of the vacuum isolation panel. The penetration bodies consist of a pair of shafts, penetrating in a concentric way and being supposed to be gastight connected with each other.

US 2005/0053755 discloses another method, wherein an upper and a lower foil is directly welded to each another in the area of a lead-through of the foil envelope of the vacuum isolation panel. For protection of these seams a protective tube is then inserted into the lead-through. With smaller diameters, however, the seal-seam-width is very narrow, such that sealing problems can result.

The disadvantage of the first mentioned manufacturing method is that a relative high isolation loss derives from the use of a solid lead-through and the subsequent processing is time and cost consuming, as a subsequent welding is required.

Thus, the object of the present invention is to create a vacuum isolation panel with a thin walled lead-through which exhibits isolation losses as small as possible, as well as an inexpensive and simple manufacturing.

The present invention provides a vacuum isolation panel having a core or insulating material supporting body, in whose main surface at least one lead-through is arranged. The recess for the lead-through can be made by means of mechanical processing methods as for example drilling, milling or by water jet or laser cutting into the insulating material supporting body. The insulating core or insulating material supporting body consists of inorganic materials as high-disperse silica (f. i. generated in a pyrogenous way) or fibre mats or of foam materials, as for example polystyrene or polyurethane, and has a vacuum-tight foil envelope. The vacuum isolation panel according to the invention is characterised in that a lead-through is formed as a thin walled bush directed with its outside to the insulating material supporting body. A first bush end has a first, radial, preformed collar extending from the bush into the main surface; opposite thereto a second collar is provided which is formed after passing the bush by thermal deformation to a second bush end, wherein the vacuum-tight foil envelope is then welded with both collars. These collars or flanges form a stable support surface for fasteners as for example screws etc., such that fastening the vacuum isolation panels, for example to a wall, causes no deformation of the insulating material supporting body.

Further, these flat flanges or collars form a stable clasping of the insulating core and wide annular faces for welding with the foil envelope, such that a safe seal is achieved. In order to keep isolation losses by the bush as small as possible, it is favorable that its outer side directed to the insulating material supporting body has a diffusion-tight coating. In order to further reduce diffusion losses, also the inside of the bush, forming the wall of the lead-through can be correspondingly coated in a diffusion-tight manner. Such a coating is particularly recommended for a lead-through with large diameter, as an increased diffusion can take place because of the enlarged edge surface of the lead-through.

It is recommendable to form the coating by metallic and/or inorganic layers, which are directed to the insulating material supporting body on the outside and/or the opposite inside. Metallic layers can be made for example from aluminum, whereas inorganic layers consist of deposited $SiO_x$, for example on the corresponding side (-s) of the bush or sleeve. Coating can be performed by suitable deposition processes.

The bush preferably consists of a thermoplastic resin, since thereby an intimate connection with the material-similar foil of the envelope can be achieved. For this all thermoplastic resins as for example PE, PP, copolymers or polyesters are suitable. The bush with the preformed collar on one side can be inexpensively manufactured in type of a dowel, for example by injection moulding.

The production method of such a vacuum isolation panel with an insulating material supporting body (core) and lead-through in its main surface (flat side) includes the subsequent steps:

First a recess or hole is introduced in an insulating material supporting body. This can happen by mechanical processing methods like e.g. drilling, milling etc. Then, a properly matching bush with a preformed collar (the first bush end) is introduced into the recess. The bush follows the shape of the recess and is not limited to a certain form. For forming of the second collar (after passing through the core) the second bush end projecting from the insulating material supporting body is thermally deformed. This can be made by correspondingly formed, heated press rams, which are introduced into the bush end. The insulating material supporting body is then enveloped, if necessary after cooling of the deformed bush, with a vacuum-tight foil envelope. After enveloping the system, the foil is evacuated and both flat flanges (collars) and the edge regions of the vacuum isolation panel are vacuum-tightly welded, finally.

For easy tracing of the lead-through, e.g. on a construction site, and to avoid damages of the foil and/or of the vacuum isolation panel by inappropriate opening of lead-through, the vacuum-tight foil is preferably removed within the bush. The foil can be removed by program-controlled cutting or punching. The term "lead-through" is not limited to cylindrical openings, but can show all geometric shapes of a hole, like polygons, ellipses, ovals and similar basic forms.

Other advantages, features and particularities of the invention result from the subsequent description, but are not limited to the embodiments of the invention on the basis of schematic drawings. They show in:

FIG. 1 a sectional view of a preferred embodiment of a vacuum isolation panel on manufacturing, and FIG. 2 a preferred embodiment of a finished vacuum isolation panel in perspective view.

The sectional view of FIG. 1 shows a vacuum isolation panel 10 according to the invention with two parallel arranged recesses 12 for forming a lead-through 20, each, being circumscribed by a bush 30. The bushes 30 in the embodiment of FIG. 1 consist of a thermoplastic resin and the outsides 32 (here cylindrical) directed to the insulating material supporting body 14 have a diffusion-tight coating 34 from aluminum, as indicated by points at the peripheral surface. One of the bushes 30 (in FIG. 1, left side) is still in the preformed initial state, such that passing through the core is possible, whereas the second bush 30 (in FIG. 1, right side) is shown in the already thermally deformed state. Further shown is a press ram 40, which exhibits the counter form of the final formation of the sleeve or bush 30. The bush 30 has a preformed collar 37 at the first (here lower) bush end 36, which abuts against the insulating material supporting body 14 after insertion of the sleeve 30 into the recess 12. The second bush end 38 projects above the insulating material supporting body 14 after the insertion into the recess 12. For thermal deformation the heated press ram 40 is pressed into the sleeve 30 to be deformed to a second collar 39 at the second bush end 38. After this deformation the collar 39 extends in radial direction just like the preformed collar 37 of the bush 30 to the flat side or main surface 16 of the insulating material supporting body 14 and abuts against it in almost flush way.

For completing of the vacuum isolation panel 10 the entire insulating material supporting body 14 including the bushes 30 is wrapped with a vacuum-tight foil envelope 17, which entire structure is finally evacuated on formation of a circumferential seal seam 11 by welding in the edge regions 19 (cf. FIG. 2). Simultaneously, the vacuum-tight foil envelope 17 is welded with first and the second collar 37, 39 of the sleeve 30 in one working step, such that a relatively wide annular seam surface results from the collar form.

FIG. 2 shows the vacuum isolation panel 10 in perspective view. It consists of the insulating material supporting body 14 with its vacuum-tight foil envelope 17 and shows four lead-throughs 20. In the right, upper part of the vacuum isolation panel 10 the vacuum-tight foil envelope 17 is left away, so that micro-porous material forming the insulating material supporting body 14 and the collar 37 of the bush 30 forming one lead-through 20 can be seen. After attachment of the vacuum-tight foil envelope 17 it is welded for evacuating the vacuum isolation panel. Thus, the (circumferential) seal seam 11 in the edge region 19 of the vacuum isolation panel 10 is generated, wherein also a bag can be used, and the foil envelope is welded to the flat flanges or collars 37, 39 of the bush 30.

In the embodiment of the FIG. 2 the lead-throughs 20 are still covered by the vacuum-tight foil envelope 17, which can be penetrated on the construction site, e.g. during insulation works and/or cut open or punched through as needed. The vacuum isolation panel remains unaffected, i.e. the vacuum is not destroyed as the vacuum-tight foil envelope 17 is welded with the collars 37, 39 in a gas-tight way. The vacuum isolation panel 10 can be fixed by means of screws, rivets or similar connection means to a surface to be isolated (not shown) via such a lead-through 20, but also pipes, cables etc. can be inserted in such a lead-through 20 in the main surface 16 to traverse the vacuum isolation panel 10. The traversing parts can be isolated within the lead-through 20 by foams etc. or embedded therein in order to further reduce diffusion losses at the lead-through 20.

REFERENCE SYMBOL LIST

10=vacuum isolation panel
11=seal seam
12=recesses/holes
14=insulating material supporting body
16=main surface
17=foil envelope
19=edge region
20=lead-through
30=sleeve
32=outside
34=coating
36=first bush end
37=first collar
38=second bush end
39=second collar
40=press ram

The invention claimed is:

1. Vacuum isolation panel (10) with at least one lead-through (20) in a main surface (16) of an insulating material supporting body (14) and a vacuum-tight foil envelope (17), characterised in that the lead-through (20) is formed as a bush (30) with an outer side (32) having a diffusion-tight coating (34) and facing the insulating material supporting body (14) and that on the first bush end (36) a first, preformed collar (37) is provided, extending radially away from the bush (30) to the main surface (16), and, opposite said collar, a second collar (39) is provided, formed by thermal deformation of the second bush end (38), wherein the vacuum-tight foil envelope (17) is welded to the collars (37, 39).

2. Vacuum isolation panel according to claim 1, characterised in that the coating (34) is formed by a metallic layer, an inorganic layer, or a metallic layer and an inorganic layer.

3. Vacuum isolation panel according to claim 1, characterised in that the bush (30) is made of a thermoplastic resin.

4. Vacuum isolation panel according to claim 1, characterised in that the bush (30) has a diffusion-tight coating (34) on its outside (32) and its inside.

5. Vacuum isolation panel according to claim 4, characterised in that the coating (34) is formed by a metallic layer, an inorganic layer, or a metallic layer and an inorganic layer.

6. Vacuum isolation panel according to claim 2, characterised in that the bush (30) is made of a thermoplastic resin.

* * * * *